United States Patent
Yoo et al.

(10) Patent No.: US 11,346,423 B2
(45) Date of Patent: May 31, 2022

(54) ANTI-RESONANCE APPARATUS OF PROPELLER SHAFT

(71) Applicants: Hyundai Motor Company, Seoul (KR); Kia Motors Corporation, Seoul (KR)

(72) Inventors: Sung Su Yoo, Suwon-si (KR); Hee Il Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 357 days.

(21) Appl. No.: 16/656,308

(22) Filed: Oct. 17, 2019

(65) Prior Publication Data

US 2020/0347908 A1 Nov. 5, 2020

(30) Foreign Application Priority Data

May 2, 2019 (KR) .................. 10-2019-0051687

(51) Int. Cl.
| | | |
|---|---|---|
| *F16F 15/14* | (2006.01) | |
| *F16F 15/134* | (2006.01) | |
| *F16F 7/104* | (2006.01) | |
| *F16C 3/02* | (2006.01) | |

(52) U.S. Cl.
CPC ............ *F16F 15/145* (2013.01); *F16F 7/104* (2013.01); *F16F 15/134* (2013.01); *F16C 3/026* (2013.01)

(58) Field of Classification Search
None
See application file for complete search history.

(56) References Cited

U.S. PATENT DOCUMENTS

| | | | | |
|---|---|---|---|---|
| 3,075,406 | A | * 1/1963 | Butler, Jr. | ............ F16F 15/1442 74/574.4 |
| 4,060,009 | A | 11/1977 | Wyman | |
| 5,188,002 | A | 2/1993 | Wolf et al. | |
| 9,297,438 | B2 | * 3/2016 | Meacham | ............... F01D 25/28 |
| 10,401,753 | B2 | * 9/2019 | Jeans | .................. F16F 15/1435 |
| 2004/0040777 | A1 | * 3/2004 | Campbell | ............... F16F 7/104 180/379 |
| 2007/0144852 | A1 | 6/2007 | Furuya | |
| 2009/0062023 | A1 | * 3/2009 | Habara | ................. F16F 15/322 464/180 |

FOREIGN PATENT DOCUMENTS

| | | |
|---|---|---|
| JP | 2008-208913 A | 9/2008 |
| KR | 10-0559889 B1 | 3/2006 |
| KR | 10-0608567 B1 | 7/2006 |
| KR | 10-2008-0024269 A | 3/2008 |

* cited by examiner

*Primary Examiner* — Vicky A Johnson
(74) *Attorney, Agent, or Firm* — Morgan, Lewis & Bockius LLP

(57) ABSTRACT

An anti-resonance apparatus of a propeller shaft may include a support provided in a tube and configured to be rotated with the tube, and including at least a guide pin arranged at equal angles around a longitudinal axis of the tube and formed in a radial direction of the support, at least a mass body slidably engaged to the at least a guide pin and guided by the at least a guide pin to be moved along a longitudinal axis of the at least a guide pin, and a return spring configured to provide an elastic force in a moving direction in which the at least a mass body is moved toward the support.

12 Claims, 11 Drawing Sheets

ANTI-RESONANCE APPARATUS OF PROPELLER SHAFT

CROSS REFERENCE TO RELATED APPLICATION

The present application claims priority to Korean Patent Application No. 10-2019-0051687, filed on May 2, 2019, the entire contents of which is incorporated herein for all purposes by this reference.

BACKGROUND OF THE INVENTION

Field of the Invention

The present invention relates to an anti-resonance apparatus of a propeller shaft for changing a natural frequency of the propeller shaft depending on a vehicle speed to prevent resonance due to critical revolution of the propeller shaft

Description of Related Art

A propeller shaft transfers driving force between a transmission (or transfer) and a rear differential of a 4WD or FR vehicle. When the length of the propeller shaft is increased, if a critical speed is reached, the excitation frequency (with one time per one revolution of the propeller shaft) due to an imbalanced self-mass of the propeller shaft and the primary bending natural frequency of the propeller shaft are equalized, and thus serious vibration and damage thereof may be caused due to resonance and the propeller shaft needs to be designed in consideration of this.

That is, in the case of a general vehicle with a long wheel base, the length to a rear joint connected to a rear differential from a front joint of the propeller shaft connected to the transmission is excessively increased. Thus, when the propeller shaft is configured in 1-piece type (2-joint & 1-tube structure), the primary component excitation frequency (which has a bending direction due to an imbalanced mass) and the primary bending natural frequency, which are generated via rotation of the propeller shaft within a range of a vehicle operation speed due to the very low primary bending natural frequency of a tube, and thus there is a problem in that serious vibration and damage of the propeller shaft are caused.

To overcome this, conventionally, as shown in FIG. 1, the length of each tube may be reduced while a center joint 5 is applied to an intermediate portion of the propeller shaft to divide the tube into a front tube 1 and a rear tube 3, and thus the primary bending natural frequency of the tube may be increased. That is, even if the tube is divided, the natural frequency is present, but the length of a separate tube is reduced to excessively increase the natural frequency.

Accordingly, the primary bending natural frequency may be spaced apart to be higher than the revolution imbalanced excitation frequency of the propeller shaft, and thus the primary bending natural frequency and the excitation frequency may not cross each other, preventing resonance from occurring.

FIG. 2 and FIG. 3 are diagrams showing comparison of a primary bending natural frequency of a propeller shaft between the case in which the propeller shaft includes one tube and the case in which the propeller shaft includes two tubes.

Accordingly, when the propeller shaft includes one tube, the primary bending natural frequency ($f_n$ or $\omega_n$) of the propeller shaft is present within a maximum driving speed range of the vehicle, as shown in FIG. 2, and thus when a vehicle is continuously driven while the excitation frequency ($f_c$ or $\omega_c$) (which is proportional to a vehicle driving speed) due to the revolution imbalanced of the propeller shaft is close to the primary bending natural frequency, damage with serious vibration of the propeller shaft may be caused.

However, when the propeller shaft includes two tubes, the primary bending natural frequency ($f_n$ or $\omega_n$) is present is present above the maximum driving speed range of the vehicle, as shown in FIG. 3, and thus the excitation frequency ($f_c$ or $\omega_c$) due to revolution imbalance of the propeller shaft is spaced from the primary bending natural frequency ($f_n$ or $\omega_n$) to prevent influence of resonance.

However, accordingly, when the propeller shaft is divided, components such as a tube and a joint are further required, and thus there is a problem in terms of increased cost and weight and the disadvantageous number of processes.

Needless to say, a method of increasing the bending natural frequency of the propeller shaft includes a method of increasing a diameter of a tube and a method of changing a material of the tube to a material with high specific stiffness as well as the aforementioned method of reducing the length of the propeller shaft via division.

However, in the method of increasing a diameter of a tube, a lower space of a vehicle is narrow and the weight of the vehicle is increased, and thus it is not possible to indefinitely increase the diameter of the tube, and when the tube is formed of a material such as CFRP, specific stiffness is partially increased, but cost is remarkably increased, and when the length of the propeller shaft is further increased, there is also a limit in increasing the natural frequency any longer.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an anti-resonance apparatus of a propeller shaft for changing a natural frequency of the propeller shaft depending on a vehicle speed to prevent resonance due to critical revolution of the propeller shaft.

According to an exemplary embodiment of the present invention, an anti-resonance apparatus of a propeller shaft includes a support provided in a tube and configured to be rotated with the tube, and including guide pins arranged at equal angles around a longitudinal axis of the tube and formed in a radial direction of the support, a mass body slidably engaged to the guide pins and guided by the guide pins to be moved along the guide pins, and a return spring configured to provide an elastic force in a moving direction in which the mass body is moved toward the support.

The anti-resonance apparatus may further include flanges formed on opposite end portions of the support, wherein an external circumferential surface of the flanges may be fixed to an internal circumferential surface of the tube, and the support may be rotated with the tube.

The support may be formed in the longitudinal axis of the tube, a plurality of guide pins are formed in the longitudinal direction of the support, and the plurality of guide pins may be paired and a mass body is mounted to each pair of the guide pins.

One end portion of the guide pin may be fixed to an external circumferential surface of the support, a remaining end portion of the guide pin may protrude toward an internal circumferential surface of the tube, and the mass body may be mounted to the guide pin and may be moved between the external circumferential surface of the support and the internal circumferential surface of the tube.

The guide pins may be formed to face each other around a longitudinal axis of the support.

An external surface of the mass body, which faces the internal circumferential surface of the tube, may be formed with an arc shape corresponding to the internal circumferential surface of the tube.

A return spring may be mounted to the guide pin and may be configured to be provided between the external circumferential surface of the support and the mass body.

A single tube may be connected between a transmission and a rear differential.

A natural frequency at which the propeller shaft is operated in a state in which the mass body is spaced from the tube may be spaced apart to be higher than a frequency at a time point of a specific vehicle speed, and a natural frequency at which the propeller shaft is operated in a state in which the mass body contacts with the tube may be spaced apart to be smaller than a frequency at a time point of a specific vehicle speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
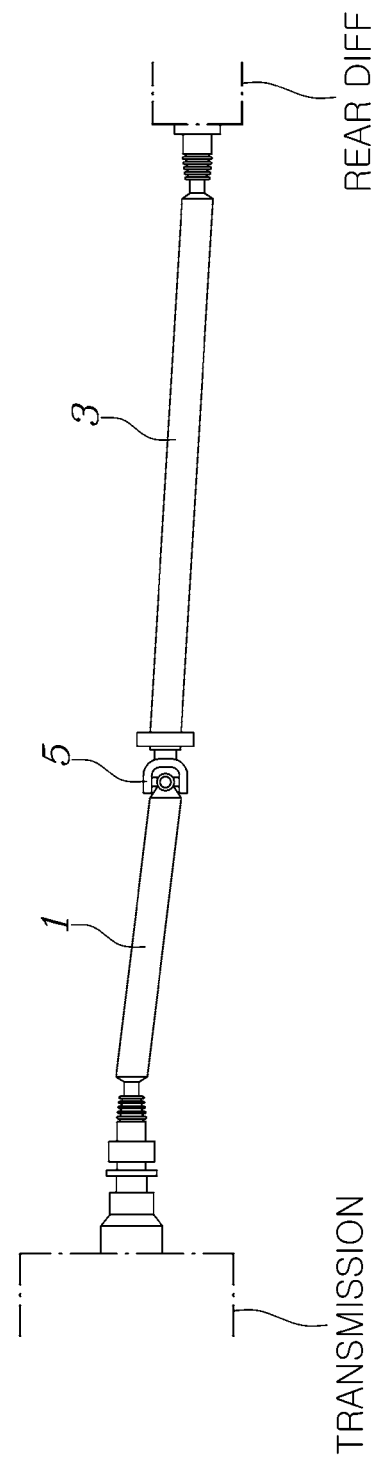
FIG. 1 is a diagram showing an example of a conventional propeller shaft including two tubes.
Figure 2:
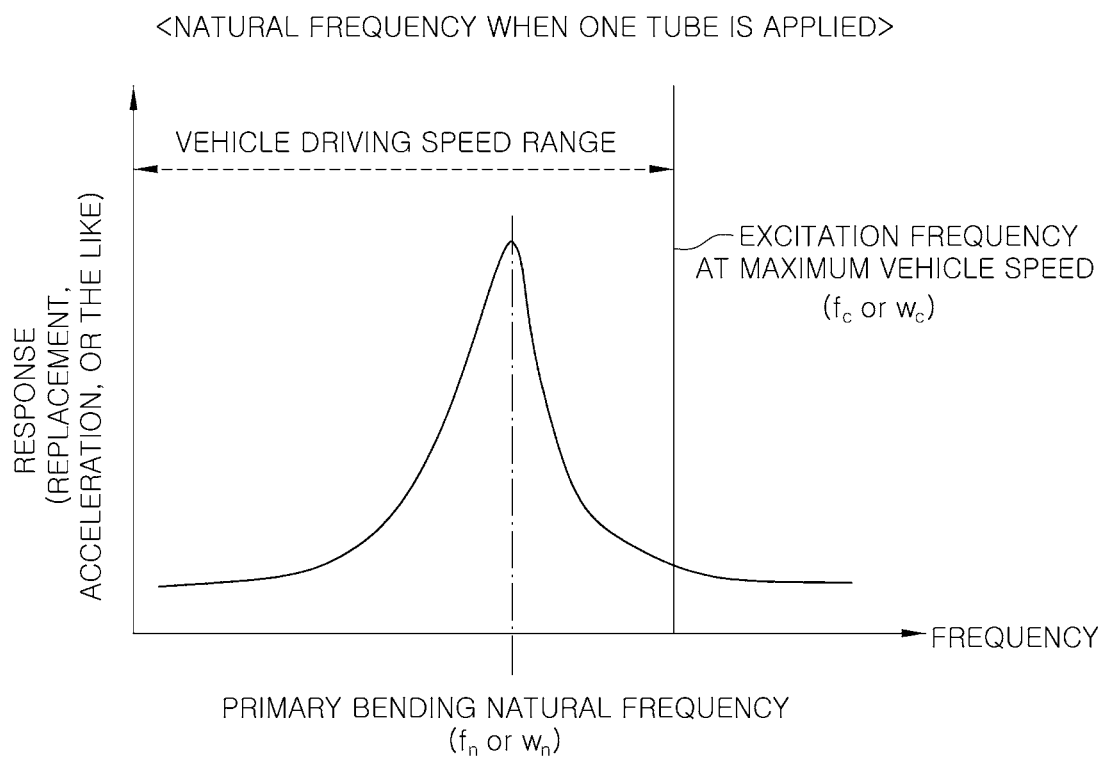
FIG. 2 is a diagram showing a natural frequency of a conventional propeller shaft including one tube.
Figure 3:
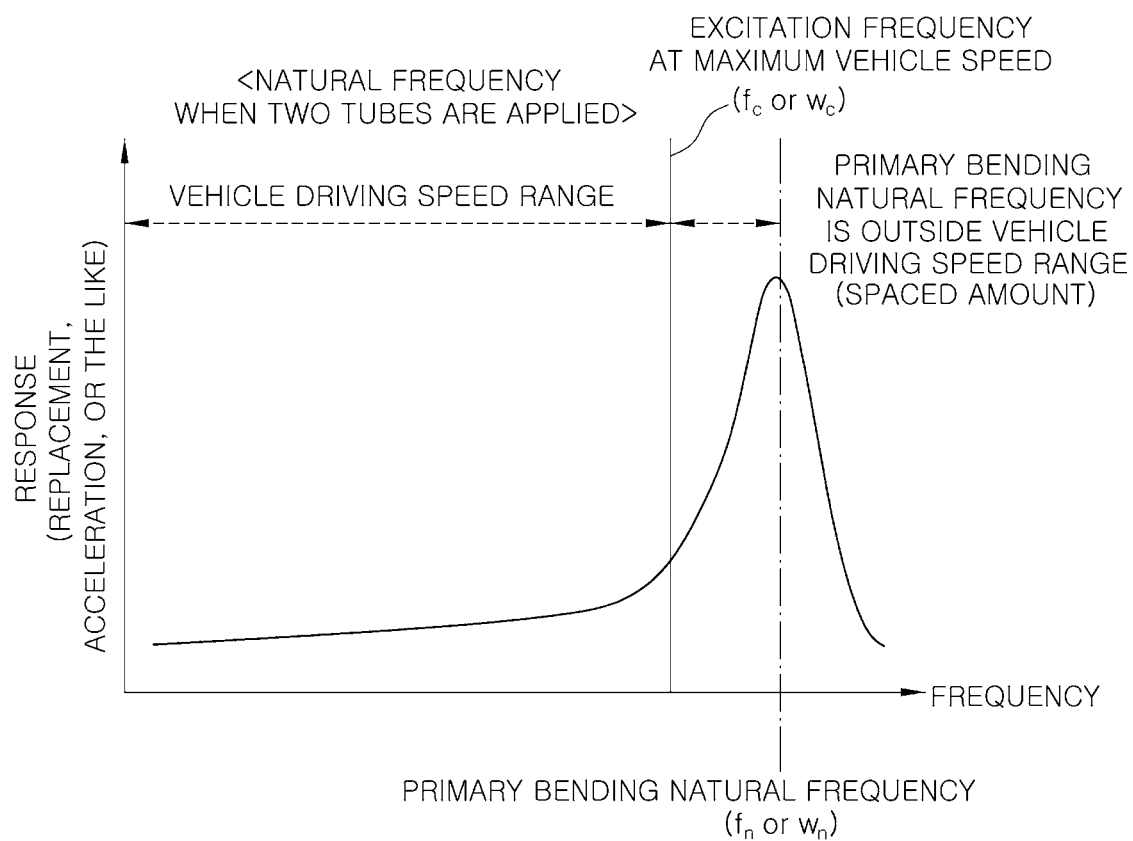
FIG. 3 is a diagram showing a natural frequency of a conventional propeller shaft including two tubes.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the appended drawings.

Figure 4:
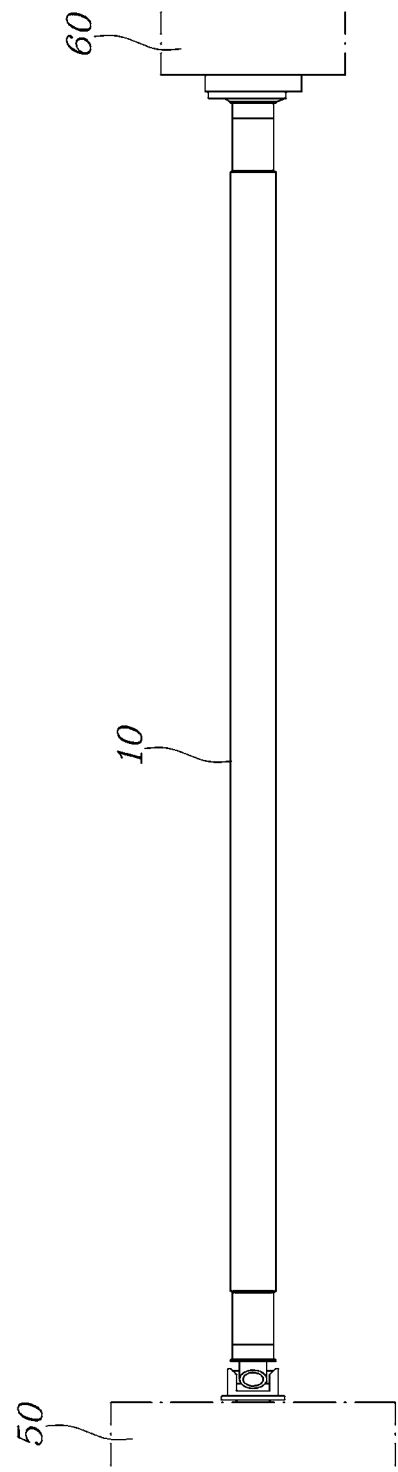
FIG. 4 is a diagram showing an external appearance of a propeller shaft including a single tube according to an exemplary embodiment of the present invention.

As shown in FIG. 4, a propeller shaft according to an exemplary embodiment of the present invention may include one single tube 10, and may be configured by welding yokes to opposite end portions of the tube 10 and assembling a front joint and a rear joint to the yokes, respectively. The propeller shaft may be mounted in a vehicle by connecting the front joint to a transmission 50 and connecting the rear joint to a rear differential 60.

An anti-resonance apparatus may be mounted in the tube 10 and may be configured to change the natural frequency of the propeller shaft depending on a vehicle speed.

Accordingly, the anti-resonance apparatus of the propeller shaft according to an exemplary embodiment of the present invention may include a support 20, mass bodies 30, and a return spring 40.

Figure 5:
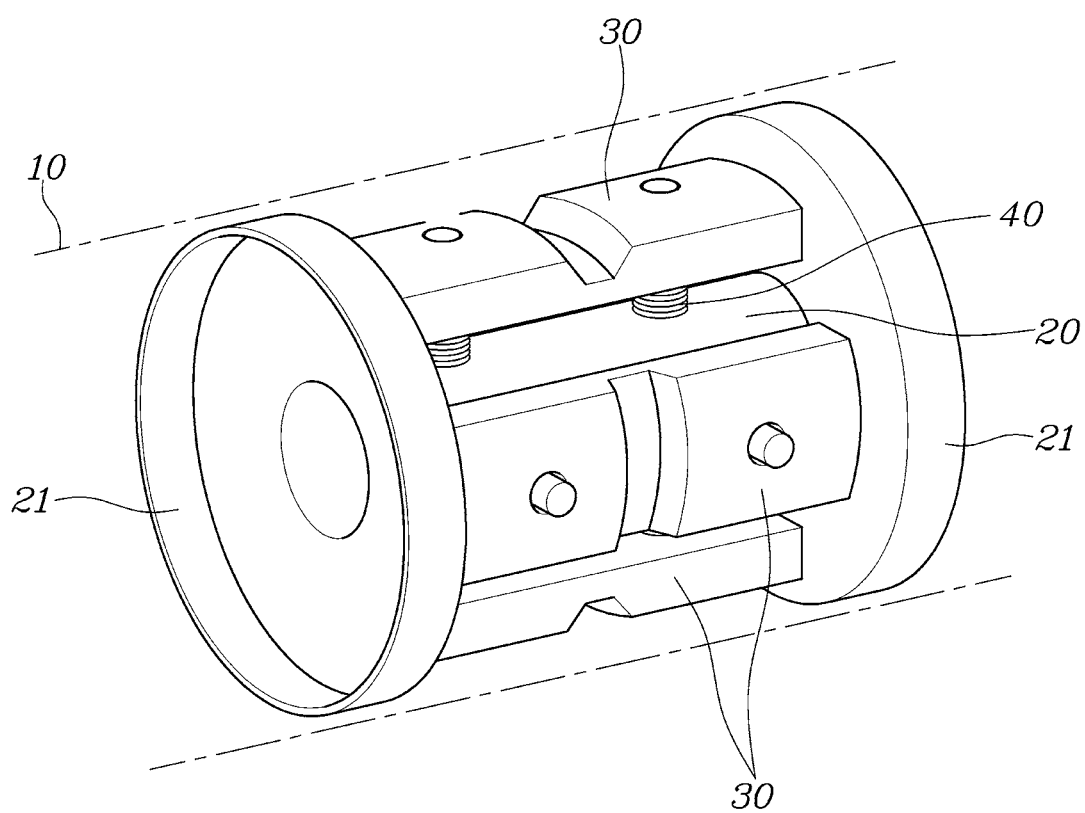
FIG. 5 is a diagram showing a shape of an anti-resonance apparatus according to an exemplary embodiment of the present invention.
Figure 6:
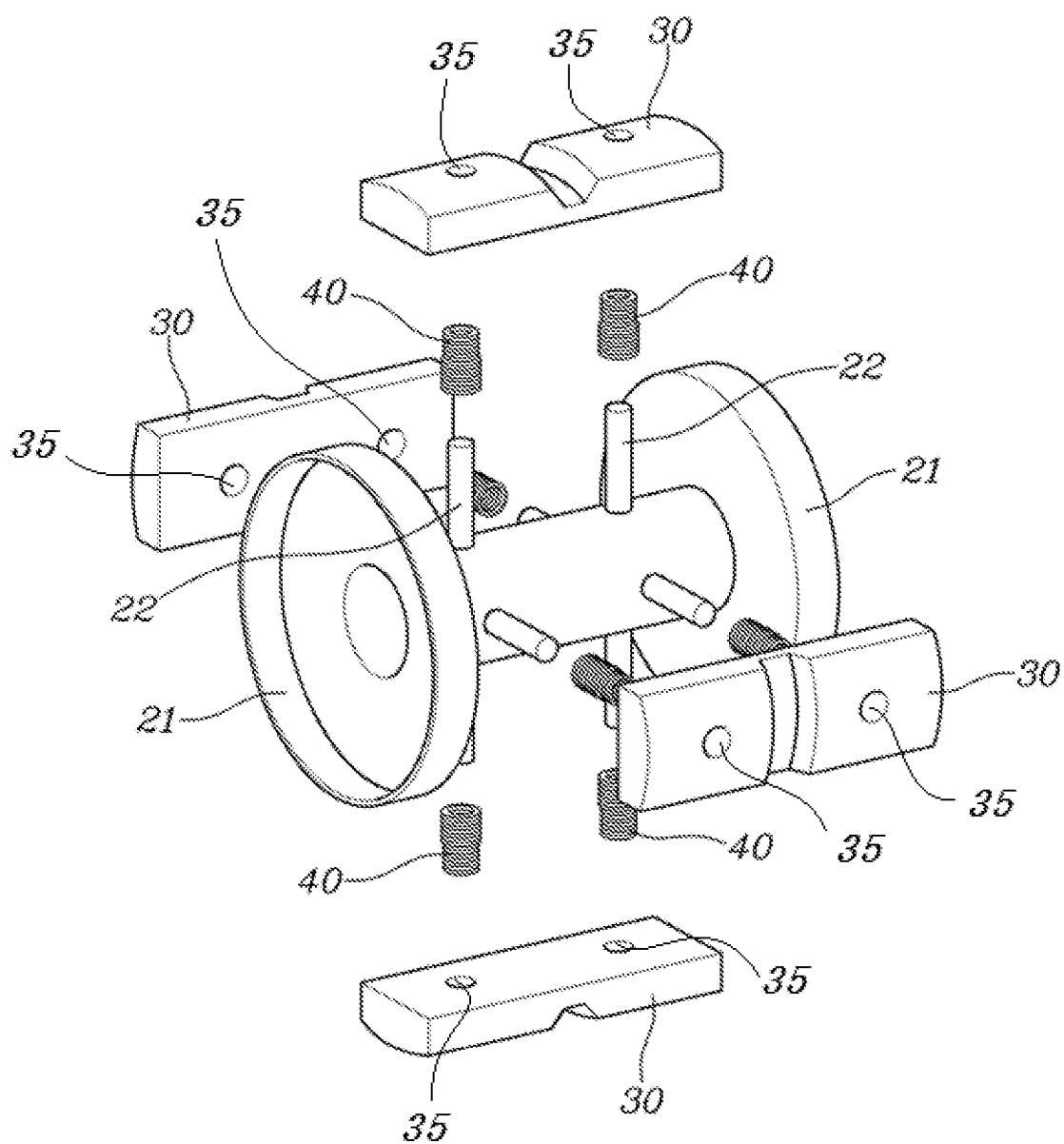
FIG. 6 is a diagram showing a divided anti-resonance apparatus according to an exemplary embodiment of the present invention.

Referring to FIG. 5 and FIG. 6, the present invention will now be described. The support 20 may be provided in the tube 10 and may be rotated with the tube 10, and guide pins 22 may be arranged at equal angles around a longitudinal axis of the tube 10 and may protrude in a radial direction based on the axis.

The mass bodies 30 may be guided by the guide pins 22 to be moved in a radial direction of the tube 10.

In an exemplary embodiment of the present invention, the mass bodies 30 include guide holes 35 into which the guide pins 22 are slidably mounted.

The return spring 40 may provide an elastic force in a moving direction in which the mass bodies 30 are moved toward the support 20.

That is, as the tube 10 configuring the propeller shaft is rotated, the mass bodies 30 may be rotated with the support 20 included in the tube 10 around the axis of the tube 10.

Figure 10:
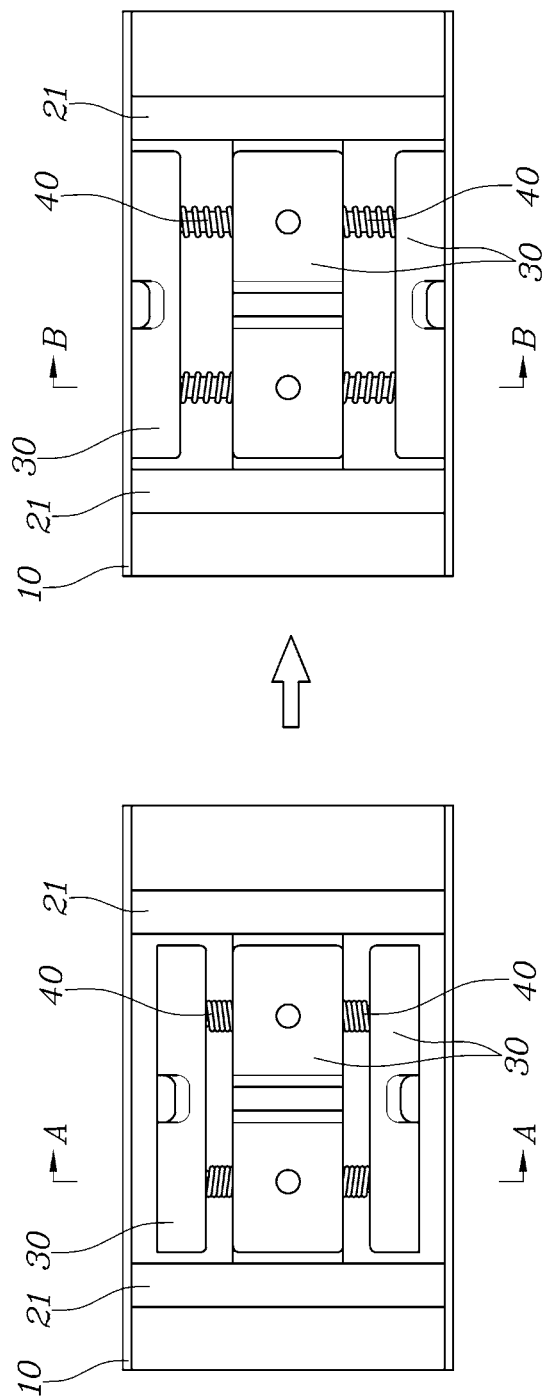
FIG. 10 is a diagram for explanation of an operation in which a mass body is moved in a state in which the mass body is spaced from a tube according to an exemplary embodiment of the present invention.
Figure 11:
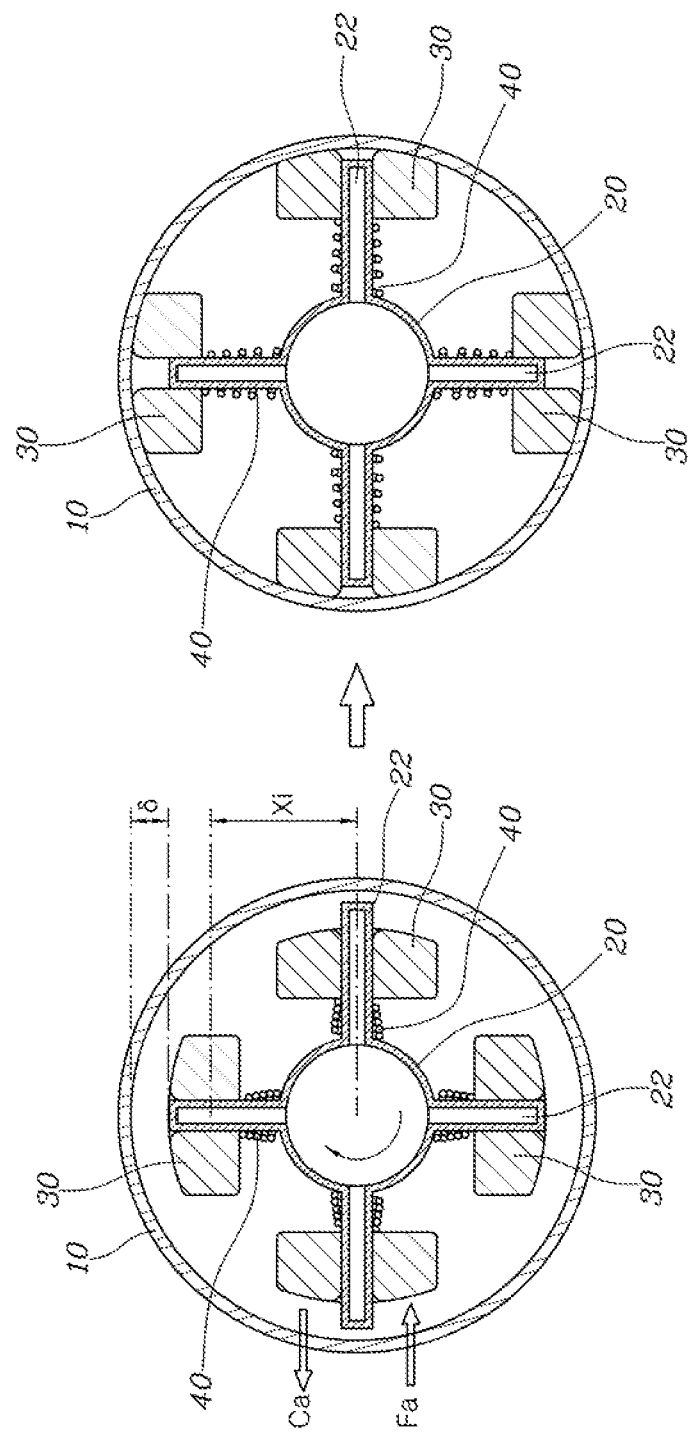
FIG. 11 is a cross-sectional diagram taken along lines A-A and B-B of FIG. 10.

Accordingly, like in a state shown in a left side of FIG. 10, and FIG. 11, in a region with a low rotation speed, centrifugal force of the mass bodies 30 is smaller than elastic force of the return spring 40, and thus the mass bodies 30 are not configured for being moved toward an internal circumferential surface of the tube 10, and in the instant case the excitation frequency due to revolution imbalance of the propeller shaft may also be low due to a low vehicle speed, and thus the natural frequency and the excitation frequency may be spaced from each other, preventing resonance.

On the other hand, when the rotation speed of the propeller shaft is increased along with an increase in vehicle speed, like in a state shown in a right side of FIG. 10, and FIG. 11, the mass bodies 30 may be moved toward an internal circumferential surface of the tube 10 and the mass bodies 30 may be closely positioned on the internal circumferential surface of the tube 10 as centrifugal force of the mass bodies 30 becomes greater than elastic force of the return spring 40, and accordingly, the mass of the mass bodies 30 may be added to the tube 10, and thus the natural frequency of the tube 10 may be lowered.

However, in the instant case, due to a high vehicle speed, as the excitation frequency due to revolution imbalance of the propeller shaft is increased, the natural frequency and the excitation frequency may be spaced from each other and may not cross each other, preventing resonance.

Accordingly, according to an exemplary embodiment of the present invention, the natural frequency of the propeller shaft may be changed depending on a vehicle speed, and thus when the length of the propeller shaft is increased or a single tube 10 is used, resonance due to the critical revolution may be prevented, and thus the propeller shaft may be prevented from being damaged.

Furthermore, the propeller shaft (2-joint & 1-tube structure) including the single tube 10 may be embodied without an increase in the size (diameter) of a tube of the propeller shaft or division of the length of the tube, and thus the number of components applied to the propeller shaft may be reduced to enhance competitiveness in terms of weight and cost and to reduce the number of processes.

Referring to FIG. 5 and FIG. 6, according to an exemplary embodiment of the present invention, flanges 21 may be formed on opposite end portions of the support 20, the external circumferential surface of the flanges 21 may be fixed to the internal circumferential surface of the tube 10, and thus the support 20 may be configured to be rotated with the tube 10.

For example, the flanges 21 may be formed with a shape corresponding to a shape of the internal circumferential surface of the tube 10 and may be mounted to the internal circumferential surface of the tube 10, and thus the flanges 21 may be fixed to the internal circumferential surface of the tube 10. In detail, the flanges 21 may be fixed to the tube 10 by tightly fitting the flanges 21 against the tube 10 or by adhering the flanges 21 to the tube 10.

According to an exemplary embodiment of the present invention, the support 20 may be formed in a longitudinal direction along a longitudinal axis of the tube 10, and the plurality of guide pins 22 may be formed in a longitudinal direction of the support 20.

The plurality of guide pins 22 may be paired and the mass body 30 may be mounted to each pair of the guide pins 22.

That is, one mass body 30 may be mounted to two or more guide pins 22 formed along the axis of the support 20, and thus only straight movement along the guide pins 22 may be allowed while rotation of the mass body 30 around the guide pin 22 is limited.

The guide pins 22 may be arranged at equal angles based on the axis of the support 20, and in detail may be formed to face each other.

Figure 7:
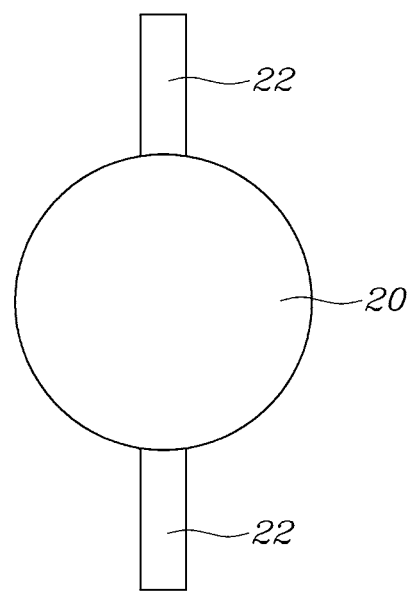
FIG. 7, FIG. 8 and FIG. 9 are diagrams showing embodiments in which the number of guide pins is changed according to an exemplary embodiment of the present invention.
Figure 8:
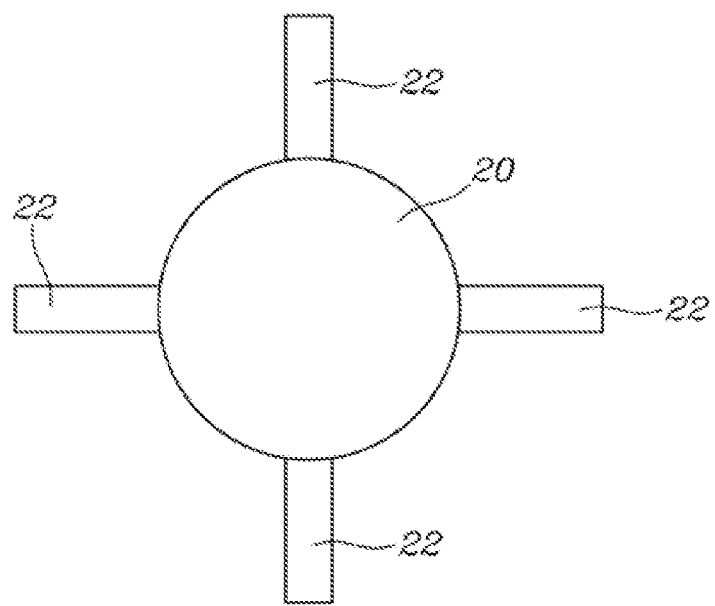
Figure 9:
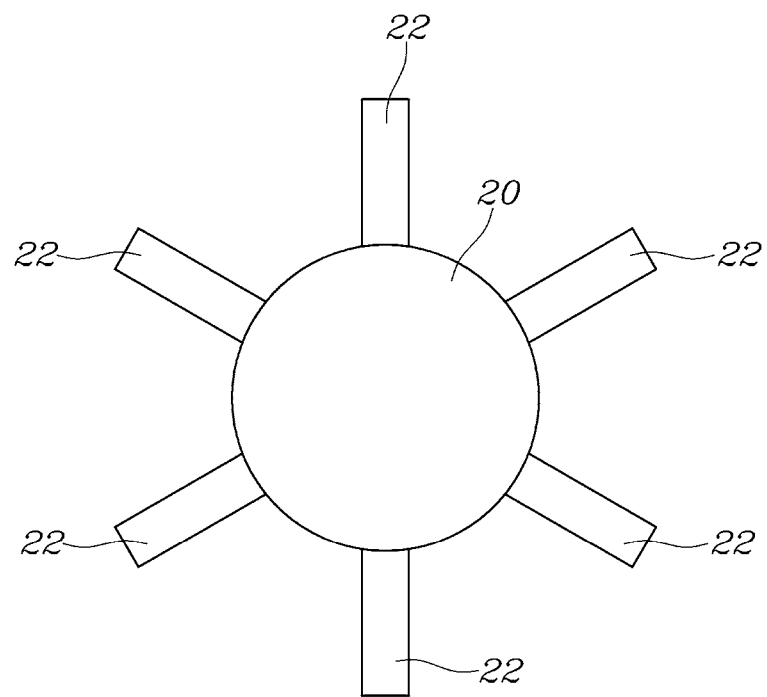

For example, as shown in FIGS. 7 to 9, when two, four, and six guide pins 22 are mounted at equal angles based on the axis of the support 20, the guide pins 22 may be mounted to be symmetrical to each other, but the number and installation position of the guide pins 22 may be changed depending on the number and size of the mass bodies 30.

As shown in FIG. 11, one end portion of the guide pin 22 may be fixed to the external circumferential surface of the support 20, and the other end portion of the guide pin 22 may protrude toward the internal circumferential surface of the tube 10.

The mass bodies 30 may be mounted to the guide pins 22 and may be moved between the external circumferential surface of the support 20 and the internal circumferential surface of the tube 10.

That is, as shown in FIG. 10, and FIG. 11, when centrifugal force of the mass body 30 is smaller than elastic force of the return spring 40, the return spring 40 may pull the mass body 30 and the mass body 30 may not be configured for being moved, and thus the tube 10 and the mass body 30 may operate as separate masses. When centrifugal force of the mass body 30 is greater than elastic force of the return spring 40, the mass body 30 may be moved toward the support 20 along the guide pins 22 and may be closely positioned on the internal circumferential surface of the support 20, and thus the tube 10 and the mass body 30 may operate as one mass.

In addition, an external surface of the mass body 30, which faces the internal circumferential surface of the tube 10, may be formed with an arc shape corresponding to the internal circumferential surface of the tube 10.

That is, one surface of the mass body 30 may be stably and closely positioned on the internal circumferential surface of support 20, and thus shock and noise in the case of contact may be reduced, and the tube 10 and the mass body 30 may be maintained in a state in which the tube 10 and the mass body 30 are closely positioned.

The return spring 40 may be mounted to the guide pin 22 and may be included between the external circumferential surface of the support 20 and the mass body 30.

For example, in a state in which the return spring 40 is mounted to the guide pin 22, one end portion of the return spring 40 may be fixed to the external circumferential surface of the support 20, and the other end portion of the return spring 40 may be fixed to the mass body 30.

Hereinafter, an operational principle and operational state of the anti-resonance apparatus according to an exemplary embodiment of the present invention will be described.

As shown in FIG. 10, and FIG. 11, according to an exemplary embodiment of the present invention, in a vehicle speed less than a specific vehicle speed ($V_t$ or specific propeller shaft rotation speed $\omega_t$), a mechanism (hereinafter, "spacing mechanism") in which the mass body 30 is spaced from the internal circumferential surface of the tube 10 may be operated, and then after the specific vehicle speed $V_t$, a mechanism (hereinafter, "contact mechanism") in which the mass body 30 contacts with the internal circumferential surface of the tube 10 may be operated.

Figure 12:
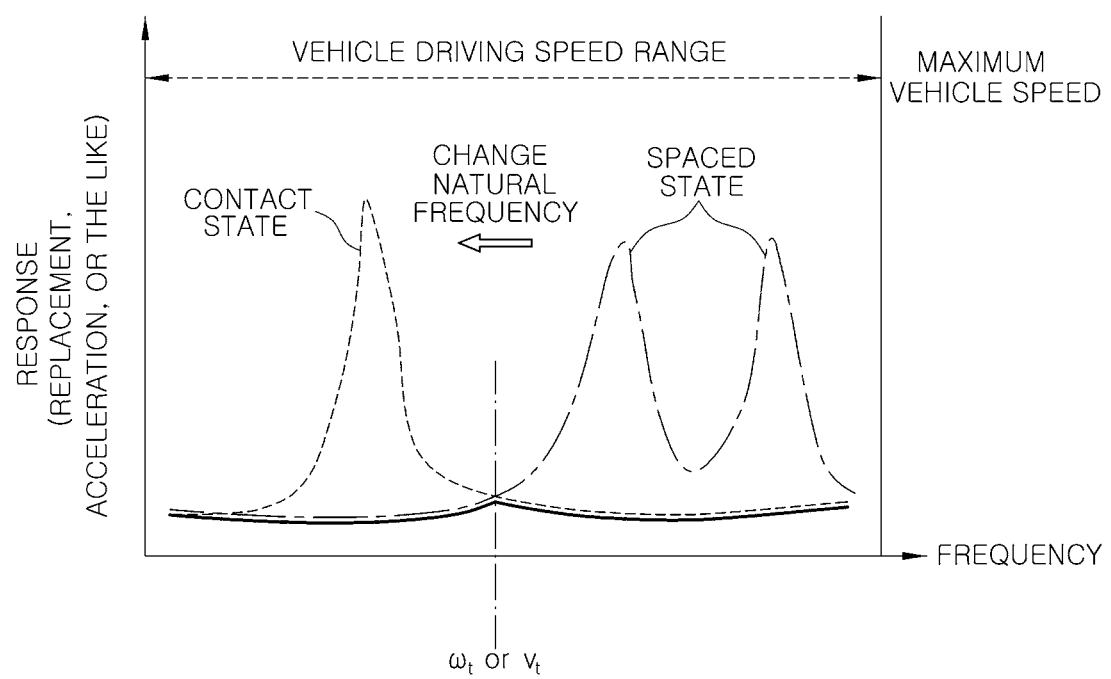
FIG. 12 is a diagram for explanation of an operation in which a natural frequency is changed along with movement of a mass body according to an exemplary embodiment of the present invention.

In the instant case, the specific vehicle speed $V_t$ may refer to a frequency at a time point of a vehicle speed at which two response plots cross each other when frequency response curves of the spacing mechanism and the contact mechanism overlap each other and then plots for minimizing response within an entire frequency range are followed, as shown in FIG. 12.

Accordingly, in a vehicle speed less than the specific vehicle speed $V_t$, the mass bodies 30 may be operated while being spaced from the tube 10, and thus the primary bending natural frequency may be positioned at a higher frequency than the excitation frequency at a current vehicle speed, and on the other hand, in the specific vehicle speed $V_t$ equal to or greater, the mass bodies 30 may be operated while contacting with the tube 10, and thus the primary bending natural frequency may be positioned at a lower frequency than the excitation frequency at the current vehicle speed.

That is, when a vehicle speed (rotation speed of the propeller shaft) is gradually increased and becomes equal to or greater than the specific vehicle speed $V_t$, the natural frequency may be moved toward a lower speed than the specific vehicle speed $V_t$ and may be spaced from the self-excitation frequency in the propeller shaft.

On the other hand, when the vehicle speed is gradually reduced and becomes less than the specific vehicle speed $V_t$, the natural frequency may be moved toward an upper speed than the specific vehicle speed $V_t$ and may be spaced from the self-excitation frequency in the propeller shaft.

Accordingly, the primary bending natural frequency of the propeller shaft may be changed at a time point of the specific vehicle speed $V_t$, and thus even if the natural frequency is present within a vehicle driving speed range, the natural frequency may not be configured for crossing the excitation frequency due to revolution imbalanced mass, and thus resonance may be prevented while one single tube 10 is used.

To embody the aforementioned operation, at the specific vehicle speed $V_t$, the mass bodies 30 and the return spring 40 may be configured such that the mass bodies 30 contact an internal side of the tube 10.

This procedure will now be described in more detail. First, the propeller shaft including the tube 10 of 1-piece may be configured and then the primary bending natural frequency $f_n$ thereof may be determined. In the instant case, the natural frequency $f_n$ may have a smaller value than the excitation frequency due to revolution imbalance of the propeller shaft, which is determined using a maximum vehicle speed. That is, the natural frequency may be present within a vehicle driving speed range.

Accordingly, a frequency which is sufficiently spaced apart downwardly from the primary bending natural frequency may be determined. The frequency may be a frequency at a time point when the spacing mechanism in which the mass bodies 30 according to an exemplary embodiment of the present invention are spaced from the internal circumferential surface of the tube 10 is changed to the contact mechanism and may correspond to a time point of the specific vehicle speed $V_t$.

Accordingly, when a time point of the specific vehicle speed $V_t$ is determined, this may be changed to the angular velocity $\omega_t$ of the propeller shaft, and the mass of the mass body 30, an initial position of the mass body 30, the stiffness of the return spring 40, an interval between the mass body 30 and the tube 10, and the like may be set from the changed rotation angular velocity $\omega_t$, which may be set according to the following equations with reference to FIG. 11.

$$C_a = m_a(x_i + \delta)\omega_t^2$$

$$F_a = k_a \cdot \delta$$

$$C_a = F_a$$

$$m_a = \frac{k_a \cdot \delta}{(x_i + \delta)\omega_t^2}$$

$C_a$: Centrifugal force
$m_a$: Mass of mass body
$x_i$: Initial position of mass body in stop state of tube
$\delta$: Interval between mass body and internal circumferential surface of tube $\omega_t$: Angular velocity of propeller shaft
$F_a$: Elastic force of return spring
$k_a$: Stiffness of return spring In the instant case, the natural frequency $f_a$ at which the spacing mechanism, in which the mass body 30 is spaced from the tube 10, is operated may be set to be sufficiently spaced from a higher frequency region than the specific vehicle speed $V_t$, and thus may not cross the excitation frequency in a lower frequency region than the specific vehicle speed $V_t$, preventing resonance.

$$f_a (= (1/2\pi)\sqrt{k_a/m_a})$$

On the other hand, the natural frequency at which the contact mechanism, in which the mass body 30 contacts with the tube 10, is operated may be set to be sufficiently spaced from a lower frequency region than the specific vehicle speed $V_t$, and thus may not cross the excitation frequency in a higher frequency region than the specific vehicle speed $V_t$, preventing resonance.

As described above, according to an exemplary embodiment of the present invention, the natural frequency of the propeller shaft may be changed depending on a vehicle speed, and thus when the length of the propeller shaft is increased or the single tube 10 is used, resonance due to the critical revolution may be prevented, and thus the propeller shaft may be prevented from being damaged.

Furthermore, the propeller shaft including the single tube 10 may be embodied without an increase in the size (diameter) of a tube of the propeller shaft or division of the length of the tube, and thus the number of components applied to the propeller shaft may be reduced to enhance competitiveness in terms of weight and cost and to reduce the number of processes.

According to an exemplary embodiment of the present invention, the natural frequency of the propeller shaft may be changed depending on a vehicle speed, and thus when the length of the propeller shaft is increased or a single tube is used, resonance due to the critical revolution may be prevented, and thus the propeller shaft may be prevented from being damaged.

Furthermore, the propeller shaft including the single tube may be embodied without an increase in the size (diameter) of a tube of the propeller shaft or division of the length of the tube, and thus the number of components applied to the propeller shaft may be reduced to enhance competitiveness in terms of weight and cost and to reduce the number of processes.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodi-

What is claimed is:

1. An anti-resonance apparatus of a propeller shaft including a tube, the anti-resonance apparatus comprising:
a support provided in the tube and configured to be rotated with the tube, and including at least a guide pin formed in a radial direction of the support, wherein the at least a guide pin includes a plurality of guide pins which is arranged with an equal angle from each other around a longitudinal axis of the support;
at least a mass body slidably engaged to the at least a guide pin and guided by the at least a guide pin to be moved along a longitudinal axis of the at least a guide pin; and
at least an elastic member engaged to the at least a mass body and configured to provide an elastic force to the at least a mass body in a direction in which the at least a mass body is moved toward the support.

2. The anti-resonance apparatus of claim 1, wherein the at least a mass body includes at least a guide hole into which the at least a guide pin is slidably mounted.

3. The anti-resonance apparatus of claim 1, further including a first flange and a second flange formed on a first end portion and a second end portion of the support, respectively,
wherein an external circumferential surface of the first flange and the second flange is fixed to an internal circumferential surface of the tube so that the support is rotated with the tube.

4. The anti-resonance apparatus of claim 3,
wherein the at least a mass body is mounted above an external circumference of the support between the first flange and the second flange.

5. The anti-resonance apparatus of claim 1,
wherein the support is aligned in a longitudinal axis of the tube,
wherein the at least a mass body is mounted in plural to form a plurality of mass bodies, and
wherein the plurality of guide pins are paired and the plurality of mass bodies are mounted to each pair of the plurality of guide pins.

6. The anti-resonance apparatus of claim 1,
wherein a first end portion of the at least a guide pin is fixed to an external circumferential surface of the support;
wherein a second end portion of the at least a guide pin is protrudingly formed toward an internal circumferential surface of the tube; and
wherein the at least a mass body is slidably mounted onto the at least a guide pin and is moved between the external circumferential surface of the support and the internal circumferential surface of the tube according to rotation of the tube.

7. The anti-resonance apparatus of claim 1,
wherein the at least a mass body is mounted in plural to form a plurality of mass bodies, and
wherein the plurality of guide pins is formed in pair to face each other around the longitudinal axis of the support.

8. The anti-resonance apparatus of claim 1,
wherein an external surface of the at least a mass body, which faces an internal circumferential surface of the tube, is formed with an arc shape corresponding to the internal circumferential surface of the tube.

9. The anti-resonance apparatus of claim 1,
wherein the at least an elastic member is mounted to the at least a guide pin and is configured to be mounted between an external circumferential surface of the support and the at least a mass body.

10. The anti-resonance apparatus of claim 1,
wherein the tube is mounted between and connected to a transmission and a rear differential.

11. The anti-resonance apparatus of claim 1,
wherein a natural frequency at which the propeller shaft is operated in a state in which the at least a mass body is spaced from the tube is spaced apart to be higher than a frequency at a time point of a predetermined vehicle speed.

12. The anti-resonance apparatus of claim 11,
wherein a natural frequency at which the propeller shaft is operated in a state in which the at least a mass body contacts with the tube is spaced apart to be smaller than the frequency at the time point of the predetermined vehicle speed.

* * * * *